US009683837B2

(12) United States Patent
Siercks

(10) Patent No.: US 9,683,837 B2
(45) Date of Patent: *Jun. 20, 2017

(54) OPTICAL MEASUREMENT METHOD AND MEASUREMENT SYSTEM FOR DETERMINING 3D COORDINATES ON A MEASUREMENT OBJECT SURFACE

(75) Inventor: Knut Siercks, Mörschwil (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 336 days.

This patent is subject to a terminal disclaimer.

(21) Appl. No.: 13/702,259

(22) PCT Filed: Jun. 9, 2011

(86) PCT No.: PCT/EP2011/059641
§ 371 (c)(1),
(2), (4) Date: Dec. 5, 2012

(87) PCT Pub. No.: WO2011/160962
PCT Pub. Date: Dec. 29, 2011

(65) Prior Publication Data
US 2013/0100282 A1    Apr. 25, 2013

(30) Foreign Application Priority Data

Jun. 21, 2010    (EP) .................................... 10166672

(51) Int. Cl.
*G01B 11/25*    (2006.01)
(52) U.S. Cl.
CPC .......... *G01B 11/25* (2013.01); *G01B 11/2513* (2013.01); *G01B 11/2545* (2013.01); *G01B 2210/52* (2013.01)
(58) Field of Classification Search
None
See application file for complete search history.

(56) References Cited

U.S. PATENT DOCUMENTS 6,128,086 A *   10/2000   Fowler ................... G01B 11/08
                                                                  250/342
6,992,700 B1    1/2006    Sato et al.
                          (Continued)

FOREIGN PATENT DOCUMENTS

CN    1590958 A      3/2005
CN    101697233 A    4/2010
(Continued)

OTHER PUBLICATIONS

European Search Report dated Sep. 15, 2010 as received in Application No. 10 16 6672.

*Primary Examiner* — Thai Tran
*Assistant Examiner* — Christopher T Braniff
(74) *Attorney, Agent, or Firm* — Maschoff Brennan

(57) ABSTRACT

A measurement object surface is illuminated with a pattern sequence of various patterns using a projector, which is recorded with a camera system, and the 3D coordinates for the measurement points are determined by evaluation of the image sequence. While the image sequence is being recorded translational and/or rotational accelerations of the projector, the camera system and/or the measurement object are measured at least at a measurement rate such that in each case a plurality of values for the accelerations are acquired. It is thus possible, on the basis of the measured accelerations, to take into account algorithmically, when determining the 3D coordinates, movements of the projector, the camera system and/or the measurement object, which movements occur during the illumination times of the respective individual images of the image sequence and provoke unsteadiness and/or motion blur in the respective individual images of the image sequence.

27 Claims, 6 Drawing Sheets

(56) References Cited

U.S. PATENT DOCUMENTS

| | | | |
|---|---|---|---|
| 7,184,150 B2 | 2/2007 | Quadling et al. | |
| 7,502,125 B2 | 3/2009 | Suzuki | |
| 7,860,273 B2 | 12/2010 | Kochi et al. | |
| 2002/0041282 A1* | 4/2002 | Kitaguchi et al. | 345/418 |
| 2009/0087050 A1 | 4/2009 | Gandyra | |
| 2009/0326851 A1* | 12/2009 | Tanenhaus | G01C 21/16 702/96 |
| 2010/0046005 A1* | 2/2010 | Kalkowski | G01C 11/06 356/604 |
| 2010/0239136 A1 | 9/2010 | Gandyra et al. | |
| 2010/0303341 A1* | 12/2010 | Hausler | A61B 5/0062 382/154 |

FOREIGN PATENT DOCUMENTS

| | | |
|---|---|---|
| DE | 196 33 686 A1 | 2/1998 |
| DE | 199 42 900 A1 | 5/2000 |
| DE | 101 27 304 A1 | 12/2002 |
| DE | 10 2008 036 710 A1 | 2/2010 |
| EP | 2 026 034 A2 | 2/2009 |
| EP | 2166303 * | 2/2009 |
| EP | 2 071 279 A1 | 6/2009 |
| EP | 2 166 303 A1 | 3/2010 |
| JP | 2006-525066 A | 11/2006 |
| JP | 2008-089314 A | 4/2008 |
| WO | 2004/085956 A2 | 10/2004 |
| WO | 2008/046663 A2 | 4/2008 |

\* cited by examiner

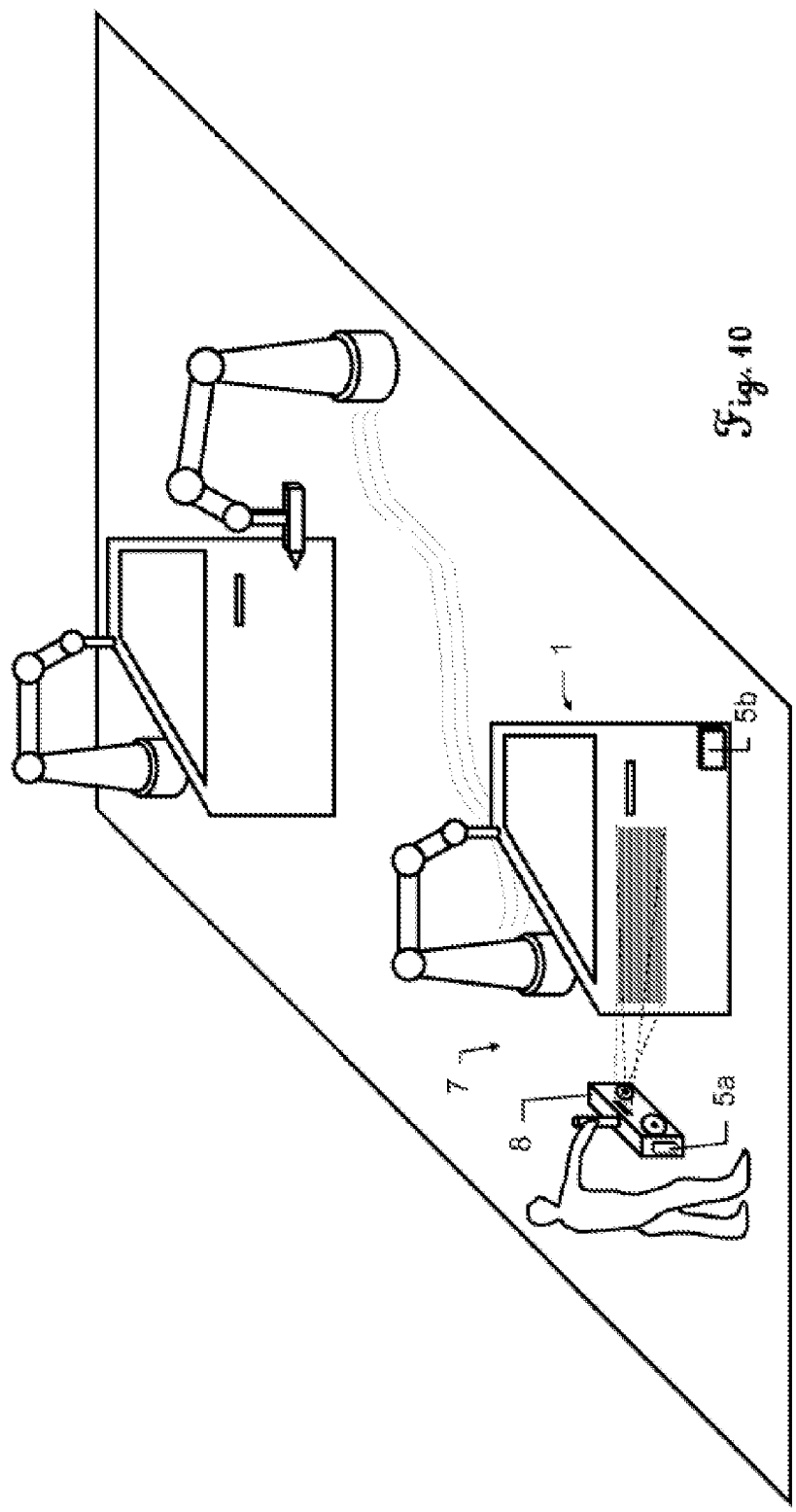

OPTICAL MEASUREMENT METHOD AND MEASUREMENT SYSTEM FOR DETERMINING 3D COORDINATES ON A MEASUREMENT OBJECT SURFACE

FIELD OF THE INVENTION

The invention relates to an optical measurement method for determining 3D coordinates of a multiplicity of measurement points of a measurement object surface and to a measurement system configured for such purpose.

BACKGROUND

Apparatuses and methods of this type are used in particular in mechanical engineering, automotive engineering, in the ceramics industry, shoe industry, jewelry industry, dental technology and in human medicine (orthopedics) and other areas, and find use for example for the measurement and protocoling of quality control, reverse engineering, rapid prototyping, rapid milling or digital mock-up.

The increasing demands for a largely complete quality control in the running production process and for digitalization of the spatial form of prototypes mean the recording of surface topographies becomes a measurement task with increasing frequency. The object here is to determine the coordinates of individual points of the surface of the objects to be measured within a short period of time.

Measurement systems using image sequences, which are known from the prior art, for determining 3D coordinates of measurement objects, which can be configured for example as portable, handheld and/or fixedly mounted systems, here generally have a pattern projector for illuminating the measurement object with a pattern, and are therefore sometimes also referred to as pattern-projecting 3D scanners or light structure 3D scanners. The pattern projected onto the surface of the measurement object is recorded by a camera system as a further constituent part of the measurement system.

As part of a measurement, the projector thus illuminates the measurement object time-sequentially with different patterns (for example parallel bright and dark stripes of different widths, the stripe pattern can in particular also be rotated for example through 90°). The camera(s) register(s) the projected stripe pattern at a known observation angle with respect to the projection. With each camera, one image is recorded for each projection pattern. Thus, a time sequence of different brightness values is produced for each pixel of all cameras.

In addition to stripes, it is also possible, however, for corresponding other patterns to be projected, such as for example random patterns, pseudocodes etc. Patterns suitable for this are sufficiently known to a person skilled in the art from the prior art. Pseudocodes enable, for example, easier absolute association of object points, which becomes increasingly difficult in the projection of very fine stripes. For this purpose, it is thus possible either to project first one or more pseudocodes in rapid succession and then a fine stripe pattern, or else, in successive recordings, different stripe patterns which become increasingly fine in the sequence, until the desired accuracy in the resolution of measurement points on the measurement object surface is achieved.

The 3D coordinates of the measurement object surface can then be calculated from the recorded image sequence using image processing according to the methods known to the person skilled in this art from photogrammetry and/or stripe projection. By way of example, such measurement methods and measurement systems are described in WO 2008/046663, DE 101 27 304 A1, DE 196 33 686 A1 or DE 10 2008 036 710 A1.

The camera system typically comprises one or more digital cameras, which are situated in a known spatial position with respect to one another during a measurement. In order to ensure a stable position of the cameras relative to one another, they are usually fixedly integrated, with known spatial positioning and alignment, together in one common housing, in particular wherein the cameras are aligned such that the fields of view of the individual cameras largely intersect. Here, two or three cameras are often used. The projector can in this case be fixedly connected to the camera system (if separate cameras are used also only to part of the available cameras of the camera system) or be positioned completely separately from the camera system.

The desired three-dimensional coordinates of the surface area in the general case, i.e. where relative positioning and alignment of the projector with respect to the camera system are fixed with respect to one another and therefore not already known in advance, are calculated in two steps. In a first step, the coordinates of the projector are determined as follows. At a given object point, the image coordinates in the camera image are known. The projector corresponds to a reversed camera. The number of the stripe can be calculated from the succession of brightness values which were measured from the image sequence for each camera pixel. In the simplest case, this is effected via a binary code (for example a gray code), which characterizes the number of the stripe as a discrete coordinate in the projector. It is thus possible to achieve a higher degree of accuracy with what is known as the phase shift method, because it can determine a non-discrete coordinate. It can be used either in supplementation of a gray code or as an absolute measuring heterodyne method.

After the position of the projector has been thus determined or in case its position relative to the camera system is already previously known, it is now possible to ascertain—for example with the intersection method—3D coordinates of measurement points on the measurement object surface as follows. The stripe number in the projector corresponds to the image coordinate in the camera. The stripe number specifies a light plane in space, the image coordinate specifies a light beam. With camera and projector position being known, the point of intersection of the plane and the straight line can be calculated. This is the desired three-dimensional coordinate of the object point in the coordinate system of the sensor. The geometric position of all image rays must be known exactly. The beams are exactly calculated using the intersection as known from photogrammetry.

In order to achieve better accuracies in this measurement method for the calculation of the 3D coordinates, the non-ideal properties of real lens systems, which result in distortions of the image, can be adapted by a distortion correction and/or a precise calibration of the imaging properties can take place. All imaging properties of projector and cameras can be measured in the course of calibration processes known to a person skilled in the art (for example a series of calibration recordings), and a mathematical model for describing these imaging properties can be generated therefrom (using photogrammetric methods—in particular a bundling equalization calculation—the parameters defining the imaging properties are determined from the series of calibration recordings, for example).

In summary, in the pattern projection method or in light structure 3D scanners, illumination of the object with a sequence of light patterns is thus necessary in order to enable an unambiguous depth determination of the measurement points in the measurement region with the aid of triangulation (intersection). Thus, usually a plurality of recordings (i.e. a series of images) under illumination of the measurement object with corresponding different pattern projections (i.e. with a corresponding series of patterns) is necessary in order to ensure a sufficiently high accuracy with respect to the measurement result. In the handheld systems known from the prior art, such as for example in the measurement apparatus described in WO 2008/046663, the illumination sequence must here take place so quickly that a movement by the operator during the recording of the series of images does not cause measurement errors. The pixels recorded by the cameras of the individual projection must be able to be assigned with respect to one another with sufficient accuracy. Thus, the image sequence must take place faster than the pattern or image shift caused by the operator. Since the emittable optical energy of the projector is limited by the available optical sources and by radiation protection regulations, this results in a limitation of the detectable energy in the camera system and thus to a limitation of the measurement on weakly reflective measurement object surfaces. The projectors are furthermore limited in terms of the projection speed (image rate). Typical maximum image rates of such projectors are for example around 60 Hz.

For a measurement operation comprising projection of a series of patterns and recording of an image sequence of the respective patterns with the camera system, for example a measurement duration of approximately 200 ms is necessary with conventional measurement apparatuses (an example: for recording sequences from 8 to 10 images with an exposure duration of 20 ms to 40 ms per image, for example total recording times or measurement durations of between 160 ms and 400 ms per measurement position can result).

In the case of insufficient steadiness or in the case of insufficiently high position and alignment stability of the camera arrangement, of the projector (or, if appropriate, of a measurement head containing the camera arrangement and projector in an integrated fashion) and of the measurement object relative to one another during a measurement operation (in a measurement position), various undesirable effects can occur, which make the evaluation more difficult, more complicated, even impossible, or effects that adversely affect at least the attainable accuracy.

Unsatisfactory unsteadiness of the camera arrangement, of the projector (or, if appropriate, of a measurement head containing the camera arrangement and projector in an integrated fashion) or of the measurement object can here have various causes.

First, vibrations in the measurement environment (for example if the measurements are carried out at a production station integrated in a production line) can be transferred to the holder of the measurement object or to a robot arm holding the measurement head and thus result in disturbing oscillations. Therefore, measures which are complicated for oscillation damping have thus far been necessary, or it is necessary to move to specific measurement spaces, which, however, makes the production process significantly more complicated (since removal of the measurement object from the production line and its transport into the measurement space that has been specifically designed therefor are necessary).

In handheld systems, the main cause for unsatisfactory unsteadiness is in particular the natural tremor in the hand of the human user.

Negative effects to be mentioned here, which can be caused by a lack of position and orientation stability of the camera arrangement, of the projector and of the measurement object relative to one another, are, firstly, motion blur and/or camera shake in individual recorded images of an image sequence.

Secondly, however, unconformities of the individual images of an image sequence relative to one another with respect to their respective recording positions and directions relative to the measurement object (that is, variability in the recording positions and directions in the individual images within an image sequence) can occur, such that respective association of pixels in the individual images with identical measurement points on the measurement object surface is either made entirely impossible or can be made possible only with enormously high computational complexity and inclusion of information from a multiplicity of images of the same region of the measurement object surface (i.e. it might be necessary to subsequently bring the individual images into a spatial relationship in a computational manner, which is very labor-intensive, and this is why up to now, partially as a preventative measure against this effect, an excess of images per image sequence have been recorded, which mainly serve only for calculating back the spatial relationship of the recording positions and directions of the individual images among one another).

In order to expand the measurement region on the measurement object (for example for measuring an object in its entirety), frequently a plurality of measurements in succession (from various measurement positions and at different viewing angles of the cameras relative to the measurement object) are necessary, wherein the results of the various measurements are subsequently linked to one another. This can take place for example by the capturing regions being selected in each case in an overlapping fashion in the respective measurement operations and by the respective overlap being used for correspondingly joining together the 3D coordinates obtained in several measurement operations (i.e. point clouds) (i.e. identical or similar distributions in the point clouds determined in the individual measurement operations can be identified and accordingly the point clouds can be joined together).

This joining operation, however, is generally extremely intensive in terms of calculation and requires a not insignificant and disturbingly high outlay in terms of time and energy even if the greatest processor powers are available. When for example a robot arm is used to hold and guide the measurement head, a reduction of the computational outlay that is necessary for the joining operation can thus be achieved by capturing the recording positions and directions in the individual measurements on the basis of the respective robot arm position and using them for the joining as prior information (for example as boundary conditions).

The disadvantages in this case are the relatively low accuracy with which the measurement position is determinable on the basis of the robot arm position, and—nevertheless—the requirement that such a robot arm be present. Thus, the computational power necessary for joining together measurement results of a plurality of measurement operations cannot be reduced in this manner for handheld measurement systems.

Further disadvantages of systems of the prior art which use substantially coherent optical radiation for pattern illumination are—owing to undesired speckle fields occurring in the respective patterns of the pattern sequence—local measurement inaccuracies or measurement point gaps.

SUMMARY

The technical object on which the invention is based is therefore the provision of an improved optical measurement method and a measurement system, using image sequences, for determining 3D coordinates on a measurement object surface, in particular wherein one or more of the aforementioned disadvantages can be reduced or eliminated.

More specific objects of the invention are here the enabling of a more precise determination of 3D coordinates also in the case of position stability of the projector, of the camera system and/or of the measurement object that is unsatisfactory for measurement systems known from the prior art (for example owing to undesired oscillations, vibrations or unsteadiness) during the measurement operation (i.e. during the pattern sequence projection and the image sequence recording). Specifically, the intention is here to be able to reduce—firstly—errors or inaccuracies in the determination of the 3D coordinates which are caused by camera shake and/or motion blur in the individual images of an image sequence. Secondly, the goal is also to be able to reduce or eliminate errors which are caused by recording-position and recording-direction variability in the images of an image sequence with respect to one another which occur in the case of unsteadiness.

A further specific object when using a coherent source for projecting the patterns is the reduction of the local measurement gaps or local measurement inaccuracies caused by speckles occurring in the pattern on the measurement object surface.

A further specific object—in particular for handheld measurement systems—is the simplification of the joining together of measurement results (for example point clouds produced therefrom) of a plurality of measurement operations and/or the enabling of a reduction of the computational power necessary for such joining.

These objects are achieved by the implementation of the characterizing features of the independent claims. Features which develop the invention in an alternative or advantageous manner can be gathered from the dependent claims.

The invention relates to a pattern-projecting measurement method, which uses image sequences, for determining 3D coordinates of a measurement object surface and to a measurement system which is configured for said purpose.

Within the context of the invention, during a measurement operation—i.e. when recording the image sequence—translational and/or rotational accelerations of the pattern projector, of the camera system (for example, if appropriate, of a measurement head containing the camera arrangement and the projector in an integrated fashion) and/or of the measurement object are measured using inertial sensors, and the measured accelerations are taken into consideration in the determination of the 3D coordinates.

In a more detailed description, according to the invention, during the exposure times of individual images of the image sequence, the translational and/or rotational accelerations are measured during the recording of the image sequence at at least such a measurement rate that during the exposure times of the respectively individual images of the image sequence in each case a plurality of values, in particular a multiplicity of values, for the accelerations are captured. On this basis, according to the invention, movements of the projector, of the camera system and/or of the measurement object, which occur during the exposure times of the respective individual images of the image sequence and thus provoke camera shake and/or motion blur in the respective individual images of the image sequence, are then taken into consideration algorithmically on the basis of the measured accelerations in the determination of the 3D coordinates.

In particular, in dependence on the measured accelerations, compensation and/or correcting of camera shake and/or motion blur, which are caused by movements of the projector, of the camera system and/or of the measurement object occurring during the exposure times of the respective individual images of the image sequence, take place respectively in the individual images of the image sequence.

For this purpose, the inertial sensors can be arranged on the camera system, on the projector and/or on the measurement object, wherein the inertial sensors are configured in particular together as an integrated inertial measurement unit.

Depending on the embodiment variant of the camera system and of the projector, the inertial sensors can in this case also be integrated accordingly in a housing containing components of the camera system and/or of the projector.

The camera system (also referred to as camera arrangement) can be configured for example—as known already from the prior art—from one, two, three, four or more cameras, which are arranged with a fixed and known positioning and orientation relative to one another in a common housing and are configured for the substantially simultaneous recording of individual images. Alternatively, individual cameras of the camera arrangement can also be configured to be physically separate from one another with in each case a dedicated housing, which, however, generally makes the evaluation of the image sequences more difficult, because in that case the relative spatial relationship of the cameras with respect to one another is not predefined (which in the normal case results in an increased computational outlay in the evaluation of the image sequences). In addition, in the case of physically separate cameras in handheld systems, there is the difficulty during use that a plurality of separate equipment items must be carried and held. For these two reasons, the camera system can—in particular in handheld systems or systems configured to be mounted on a robot arm—be accommodated together with the projector with fixed and known positioning and orientation relative to one another physically in a common measurement head of the measurement system, in which in that case according to the invention the inertial sensors or the inertial measurement unit can also be arranged.

Likewise, a group of inertial sensors can—alternatively or additionally—also be configured for being mounted on the object to be measured, which group communicates the measured accelerations (or movements which are already derived therefrom or even positions and alignments) to the evaluation unit of the measurement system for the purpose of being considered in the 3D coordinate determination.

Specifically, here the inertial sensors are combined and integrated into an inertial measurement unit based on MEMS-based components (MEMS meaning micro electro mechanical system) such that the inertial measurement unit is configured for measuring the accelerations in all six degrees of freedom, in particular at a measurement rate between for example approximately 50 and 2000 Hz.

As is known to the person skilled in the art, here the accelerations of the six degrees of freedom can be measured as a rule using the following sensor types by the corresponding combination of a plurality of inertial sensors in an inertial measurement unit (IMU):

Three orthogonally arranged acceleration sensors (also referred to as translation sensors) detect the linear acceleration in the x or y or z axis. On this basis, the translational movement (and the relative position) can be calculated. Three orthogonally arranged rate-of-rotation sensors (also referred to as gyroscopic sensors) measure the angular acceleration about the x or y or z axis. On this basis, the rotational movement (and the relative alignment) can be calculated.

Such inertial measurement units based on MEMS-based components which are configured as miniaturized equipment or assemblies are already sufficiently known from the prior art and have been produced for a long time in large-scale production.

The accelerations of the camera system, of the projector and/or of the measurement object detected during a measurement operation—or additionally also between a plurality of measurement operations—can according to the invention be used here in the course of the evaluation (for example in the course of the determination of the 3D coordinates of the measurement points from the image sequence or in the course of the joining together of measurement results obtained from a plurality of effected measurement operations, i.e. from a plurality of image sequences) for various purposes and to improve various aspects.

If—as is provided in the context of the invention—during the exposure times of the individual images of an image sequence the accelerations are with a sufficiently high rate (i.e. a rate, which provides at least a few—for example between 5 and 50—acceleration values per exposure duration of an individual image), movements of the projector, of the camera system and/or of the measurement object during the exposure times of the individual images of the image sequence, which movements provoke camera shake and/or motion blur, can be taken into consideration algorithmically using these measured acceleration values. The measured acceleration values preferably can—according to methods for example known sufficiently from photography—be used for the compensation or correction of camera shake and/or motion blur in the individual images of an image sequence.

A lack of position and orientation stability of measurement system and measurement object relative to each other during the exposure times of the images can here be caused for example by a user holding in his hand the projector, the camera system and/or the measurement object, in particular caused by a hand tremor and inadvertently, or by vibrations or oscillations in the holders of the projector, of the camera system and/or of the measurement object.

The movement in space captured according to the invention can thus be used for example to correct blur in the individual recordings of digital cameras or triangulation scanners. In addition it is possible in handheld measurement systems to eliminate or at least reduce the principle limitations caused by the tremor of the hand of a user.

The disturbing oscillations/vibrations during the measurements which often occur during a stationary mounting of the measurement system can thus according to the invention—as described above—also be taken into consideration in the evaluation and in the determination of the 3D coordinates. As a result, it is possible for example to dispense with measures for oscillation damping which are often very complicated in terms of construction (or at least measures which are significantly less complex can be provided), with a simultaneous improvement in accuracy in the 3D coordinate determination or at least without having to accept losses in terms of accuracy. The measurement system according to the invention is thus better suited for use directly in a production line. It is generally possible—owing to the invention—to dispense with operating the measurement system "off-line" in a special measurement space, which is—viewed overall—very complicated (which includes removal of the measurement object from the production line and transporting it into the measurement space which has been accordingly designed therefor).

According to one development, the captured accelerations of measurement system components (i.e. camera arrangement/projector) and/or of the measurement object can according to the invention also be used in order to associate in each case one image recording position and direction relative to the measurement object, which is current at the respective recording time, with the respective images of an image sequence. To this end, the accelerations are captured during an entire measurement operation (i.e. the entire operation of recording an image sequence or a plurality of image sequences). In particular, to this end the accelerations can be measured at such a rate that a sufficiently exact association of the respective recording times of the individual images is made possible. If the accelerations are captured at a significantly higher rate than the images are sequentially recorded, it is also possible to associate with the respective images also those image recording positions and directions that result from an averaging of the accelerations captured during the exposure durations of the individual images.

The respective recording positions and directions associated with the individual images of an image sequence for simplified linking of pixels in the individual images with identical measurement points on the measurement object surface, also in the case that—for example owing to tremor—variability in the recording positions and directions of the individual images occurs within an image sequence.

The computational outlay for the evaluation of an image sequence (which is necessary in particular for the intersection method) can thus, according to the invention, be significantly reduced since, derived from the recording positions and directions, it is possible to determine in advance by which pixels in the respective images of the image sequence respectively identical measurement points of the surface are imaged.

Since in systems from the prior art partially an excess of images per image sequence have had to be recorded in order to bring—before the actual evaluation—the images into a spatial relationship with respect to one another by image processing, it is now possible according to the invention to reduce the computational outlay and/or the necessary number of images to be recorded per image sequence for the comparatively exact determination of the 3D coordinates from this image sequence.

On the other hand, however, the invention makes it also possible for images of an image sequence to be recorded over longer measurement intervals, since the influence by unsteadiness of measurement components during the recording of the series of images is, according to the invention, sufficiently well compensatable or correctable and does not lead to measurement failures.

For example, in order to measure larger regions of a measurement object surface, which go beyond the viewing and pattern projection region of the camera arrangement and projector, it is necessary according to the prior art for a plurality of measurement operations to be carried out and for the results (for example point clouds) to be joined together ("stitching") subsequently on the basis of partial regions which are measured in an overlapping manner.

According to the invention, it is now possible for example to also carry out a relatively long measurement operation (for example over 1-5 seconds or longer with continuously sequential recording of images), wherein the projector and camera system are deliberately moved such that ultimately an entire desired measurement region is covered (for example the entire measurement object from all sides). The movement speed and the succession of the projected patterns and the image recording frequency should here be adapted and configured such that all the partial regions are illuminated with patterns that vary sufficiently for evaluation, and a sufficient number of images are recorded thereof.

Instead of a plurality of individual measurement operations with a position and alignment stability of the camera arrangement and of the projector that is as still as possible during the respective individual measurements, whose measurement results are subsequently linked in a computationally intensive manner, it is thus possible according to the invention for a continuous measurement operation to be effected in a "gliding manner", and to bring the individual images with respect to their respective recording positions and directions—for evaluation of the image sequence—into a spatial relationship with respect to one another on the basis of the accelerations measured in the meantime according to the invention.

In a further embodiment of the invention, however, it is also possible for individual measurement operations to be carried out, whose measurement results (for example point clouds) can be joined together ("stitching") according to the invention—using the measured accelerations—with reduced computational outlay. It is now not absolutely necessary here for specific partial regions to be measured in an overlapping manner in order to enable the corresponding joining together of the measurement results in the first place. Overlapping measurement can, however, nevertheless be carried out thus so as to further increase the reliability and accuracy of the stitching of the individual measurement results also in the context of the invention. The measurement positions and directions—which can be derived on the basis of the accelerations—in the respective individual measurement operations can also be used, for example, in order to provide an improved starting value for the computational linking of the point clouds, if this relates to identical points (control points) or identical patterns/geometries (in the overlap regions).

According to a further aspect of the invention, the recording positions and directions associated with the respective images, which recording positions and directions are derived from the measured accelerations, can also be used to densify the measurement region (such that 3D coordinates are determined within a specific measurement region for a higher number of measurement points). To this end, it is possible for example with a slight deliberate movement of projector, camera arrangement and/or measurement object (for example caused by the natural tremor of the hand of a user) for a series of patterns to be projected onto a surface region and for a series of images to be recorded therefrom (or a plurality of series of the same measurement region to be linked together), and—by way of the accelerations—for the images to be brought into a spatial relationship with respect to one another in a highly precise manner, such that as a result 3D coordinates can be determined within a measurement region with a higher measurement point density. It is possible in particular as a result for 3D coordinates of measurement points to be determined on the surface of the measurement object for example also in the subpixel region of the individual images.

In a similar manner it is also made possible according to the invention for systems, which use substantially coherent optical radiation for pattern illumination, to reduce the negative influences caused by inadvertently occurring speckle fields in the respective patterns of the pattern sequence on the measurement results (for example local measurement inaccuracies or measurement point gaps). If, for example, projector, camera arrangement and/or measurement object are deliberately moved slightly during the measurement operation (for example caused by the natural tremor of the hand of a user), the speckle fields in the patterns projected onto the measurement object surface also change. As a result, it is thus possible for the speckle fields in the respective images to not occur always at identical places on the measurement object surface. In the context of an image sequence which is recorded in this manner, therefore fewer or no places should be present that are not imaged in at least some of the images of the image sequence in a manner illuminated with a substantially speckle-free pattern. Through the juxtaposition of the images of the image sequence (wherein the images are again brought into spatial relationship with respect to one another according to the invention by using the accelerations measured here), it is thus possible to reduce the negative influences caused by speckle in the case of the pattern projection with coherent optical radiation.

In summary, it is thus possible according to the invention to deliberately move for various purposes during a measurement operation (pattern sequence projection and image sequence recording) the measurement object, the camera system and/or the projector (or to reduce or eliminate the negative influences caused by an actually undesired movement). To this end the accelerations of projector, camera arrangement and/or measurement object are measured using inertial sensors and taken into consideration in the evaluation of the individual images of the image sequence.

In particular, it is possible according to the invention for a compensation or correction of influences caused by movements during the exposure time of individual images (camera shake/motion blur) in the image to be carried out for each image separately using the measured accelerations.

In addition or alternatively, it is, however, also possible for a respectively current recording position and direction, derived from the accelerations (if appropriate averaged), relative to the measurement object (and if appropriate a respective current pattern projection position and direction) to be associated with each image and thus to bring the images into a spatial relationship with respect to one another in advance for the determination of the 3D coordinates resulting from the image sequence. It is possible for example in that case for a deliberate movement of the measurement object, of the camera system and/or of the projector to be effected for enlarging the measurement region on the measurement object surface,
  for densifying the measurement region and thus for increasing the measurement point density on the measurement object surface and/or
  for changing speckle fields, which occur inadvertently in the case of illumination with substantially coherent optical radiation, in the respective patterns of the pattern sequence and thus for decreasing local measurement inaccuracies or measurement point gaps caused by such speckle fields.

Specifically it is possible here for the movement effected for these purposes to be caused by a user holding in his hand the measurement object and/or the camera system, and/or a holder which is designed therefor and controlled manually or in an automatically preprogrammed fashion—in particular a robot arm—for the projector, the camera system and/or the measurement object.

Again in addition or alternatively, it is possible during the carrying out of a plurality of individual measurement operations successively, however, for a measurement position and alignment (of camera arrangement, projector and measurement object relative to one another) to be associated with each measurement operation and thus for the joining together of the results from a plurality of individual measurement operations to be simplified or made possible in the first place.

BRIEF DESCRIPTION OF THE DRAWINGS

The method according to the invention and the apparatus according to the invention will be described in more detail below with reference to concrete exemplary embodiments illustrated schematically in the drawings in a purely exemplary manner, wherein further advantages of the invention will also be mentioned. In the figures:

FIG. 10 shows an optical measurement system according to the invention in use in a production line, wherein the vibrations, which affect the measurements with the measurement system according to the invention and which are transferred from a neighboring production station, are compensated for on the basis of the measured accelerations.

DETAILED DESCRIPTION

Figure 1:
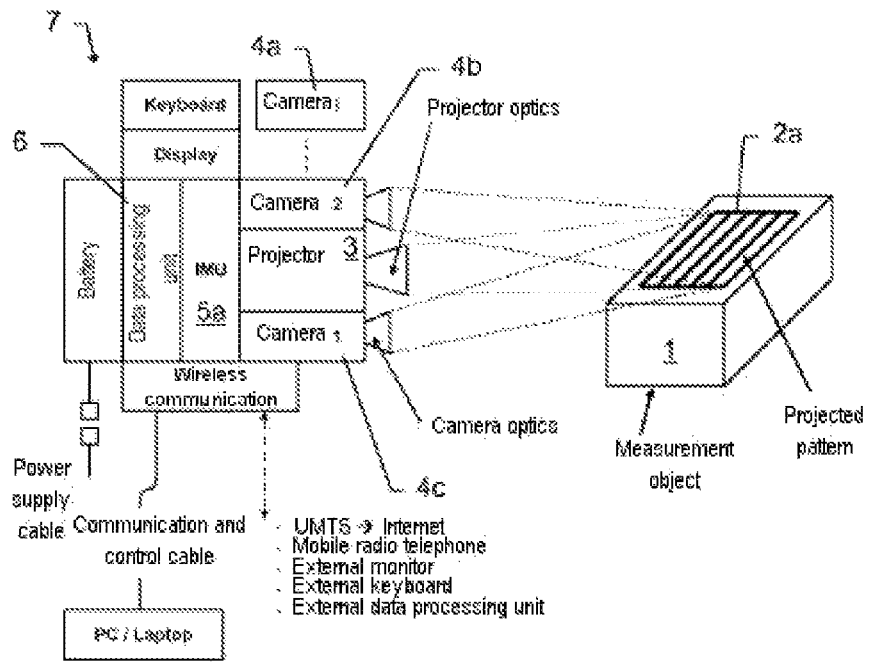
FIG. 1 shows an optical measurement system for determining 3D coordinates, wherein an inertial measurement unit (IMU) is integrated according to the invention in the handheld measurement head.

The optical measurement system 7 shown in FIG. 1 for determining 3D coordinates of a multiplicity of measurement points of a measurement object surface 1s has, according to the invention, a projector 3, a camera system 4, an evaluation unit 6 and inertial sensors 5a integrated in an inertial measurement unit (IMU).

The projector 3 is here configured for illumination of the measurement object surface 1s with a pattern sequence of different optical patterns 2a. For example, the pattern projector 3 can be configured similarly to the principle of a slide projector. However, it is also possible for other projection techniques to be used to generate the light patterns 2a, for example programmable LCD projectors, movable glass slides with different grating structures in a projector, a combination of an electrically switchable grating and a mechanical moving device or the projection of individual gratings on the basis of glass slides.

The camera system 4 is configured for the recording of an image sequence of the measurement object surface 1s illuminated with the pattern sequence and can here have at least one camera, in particular however two, three or four cameras 4a, 4b, 4c, which can be arranged for example with a fixed and known positioning and orientation relative to one another and are specifically configured for the substantially simultaneous recording of individual images.

As is known to the person skilled in the art, it is possible to use for image recording for example cameras 4a, 4b, 4c with electronic image sensor, for example CCD or CMOS sensors, which provide the image information in the form of an image matrix for further processing. It is possible in this case for both monochrome cameras and also color cameras to be used.

The evaluation unit 6 is configured for the determination of the 3D coordinates of the measurement points from the image sequence, in particular while ascertaining a succession of brightness values for identical measurement points of the measurement object surface 1s in respective images of the recorded image sequence.

The projector 3 and the camera system 4 are accommodated according to an exemplary embodiment with a fixed and known positioning and orientation relative to one another physically in a common measurement head 8 of the measurement system 7, in particular wherein the measurement head 8 is configured to be capable of being held by hand and/or for being attached to a robot arm.

According to the invention, the IMU, having the inertial sensors 5a, is also integrated into the measurement head 8, wherein the inertial sensors 5a are thus configured for measurement of translational and rotational accelerations of the measurement head 8 (i.e. of the projector 3 and of the camera system 4) during the recording of the image sequence. The inertial sensors 5a are here configured for the measurement of accelerations at at least such a measurement rate that during the exposure times of the respective individual images of the image sequence in each case a plurality of values, in particular a multiplicity of values, for the accelerations are capturable.

The evaluation unit 6 is here configured such that with it synchronized controlling of the inertial sensors 5a and of the camera system 4 is effected such that during the recording of the image sequence in each case a plurality of values for the accelerations are captured at least during the exposure times of individual images of the image sequence.

It is thus possible ultimately according to the invention using the evaluation unit 6 to algorithmically take into consideration movements of the projector 3, of the camera system 4 and/or of the measurement object 1 which provoke camera shake and/or motion blur in the respective individual images of the image sequence, on the basis of the accelerations measured by the inertial sensors 5a for the determination of the 3D coordinates.

It is possible here in particular on the basis of the measured accelerations for a compensation or correction of effects caused by movements during the exposure time of individual images (camera shake/motion blur) in the image to occur for each image separately.

To this end the evaluation unit 6 can be configured such that in dependence on the measured accelerations a compensation and/or correction of camera shake and/or motion blur—caused by movements of the projector 3, of the camera system 4 and/or of the measurement object 1 occurring during the exposure times of the respective individual images of the image sequence—in each case in the individual images of the image sequence takes place.

In summary, the accelerations are captured during the exposure times of the individual images of an image sequence at a sufficiently high rate (i.e. at a rate, which provides at least a few—for example between 5 and 50—acceleration values per exposure duration of an individual image), and based on this it is possible then to algorithmically take into consideration movements of the projector, of the camera system and/or of the measurement object during the exposure times of the individual images of the image sequence, which movements provoke camera shake and/or motion blur in the image, on the basis of these measured acceleration values. The measured acceleration values can preferably—according to methods which are sufficiently known for example from photography—be used to compensate or correct camera shake and/or motion blur in the individual images of an image sequence.

The inertial sensors 5a of the inertial measurement unit can here in particular be based on MEMS-based components and be combined and integrated into the IMU such that it is configured for the measurement of accelerations in all six degrees of freedom, in particular at a measurement rate approximately between 50 and 2000 Hz.

It is thus possible in particular controlled by the evaluation unit 6 automatically and in a preprogrammed manner, for the illustrated optical measurement system 7 to be configured and designed to carry out the optical measurement method according to the invention—as already described above.

Figure 2:
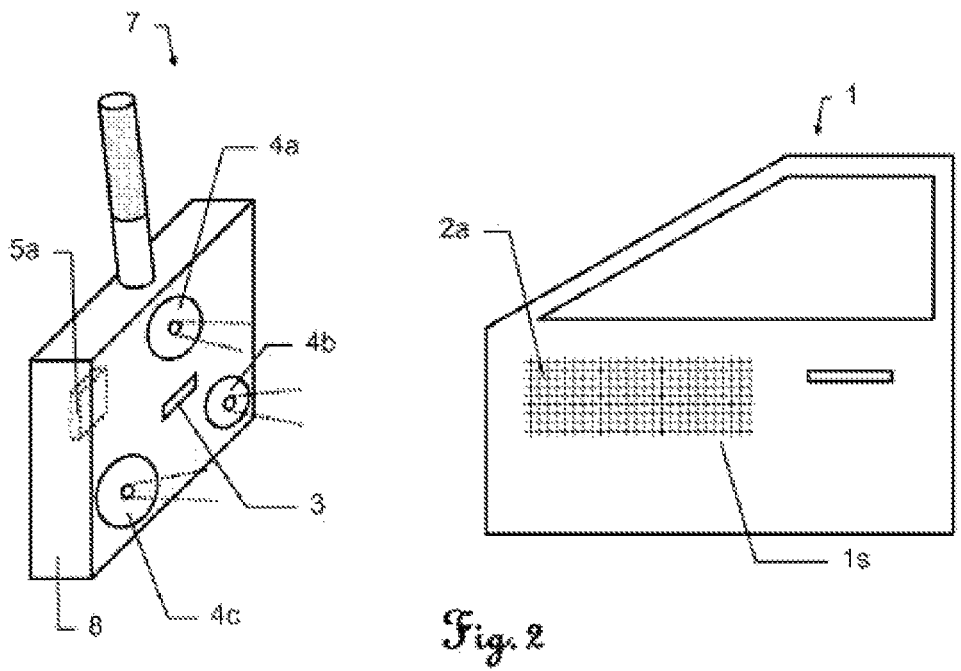
FIG. 2 shows an optical measurement system according to the invention with a handheld measurement head having an IMU, projector and three cameras, wherein a car door as the measurement object is illuminated with a pattern in the course of the 3D coordinate determination.

The exemplary embodiment shown in FIG. 2 of an optical measurement system 7 according to the invention has a handheld measurement head 8 comprising an IMU (with inertial sensors 5a), projector 3 and three cameras 4a, 4b, 4c (for example integrated in a handheld housing with handle and thus configured as a light structure 3D hand scanner), wherein a car door as the measurement object 1 is illuminated with a pattern 2a (as part of a pattern sequence) using the projector 3 in the course of the 3D coordinates determination.

The three cameras 4a, 4b, 4c of the camera system 4, which are arranged here by way of example with a fixed and known positioning and orientation relative to one another, are configured for recording an image sequence of the car door surface that is illuminated with the pattern sequence. The cameras 4a, 4b, 4c can here be configured for the substantially simultaneous recording of individual images.

In addition, an inertial measurement unit (with inertial sensors 5a) is again integrated into the measurement head 8, as a result of which a compensation according to the invention of measurement errors for example caused by unsteadiness related to hand tremor can be carried out in the course of the evaluation of the image sequence and the derivation of the 3D coordinates. In particular controlled by the evaluation unit automatically and in a preprogrammed manner, it is possible for the illustrated optical measurement system 7 to be configured and designed for carrying out the optical measurement method according to the invention—as described above.

Figure 3:
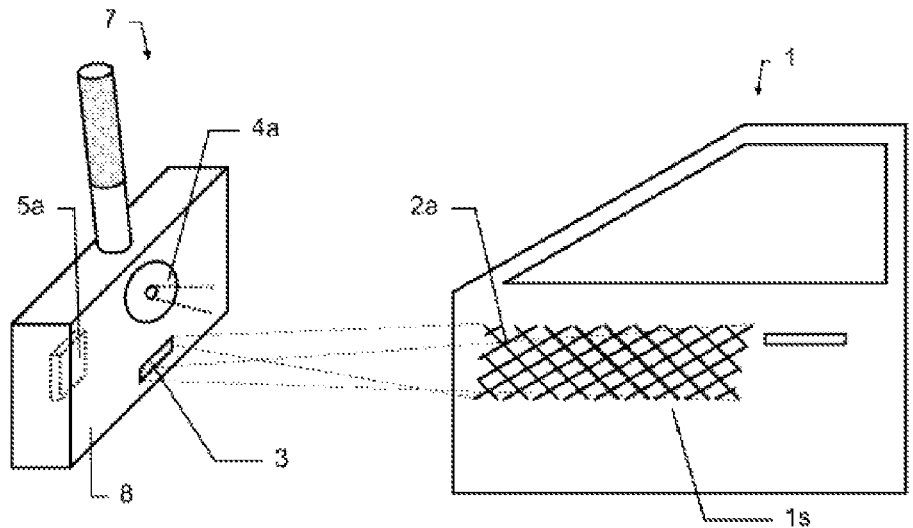
FIGS. 3 and 4 show an optical measurement system according to the invention with a handheld measurement head having an IMU, projector and a camera, wherein a car door as the measurement object is illuminated successively with patterns having different degrees of fineness.
Figure 4:
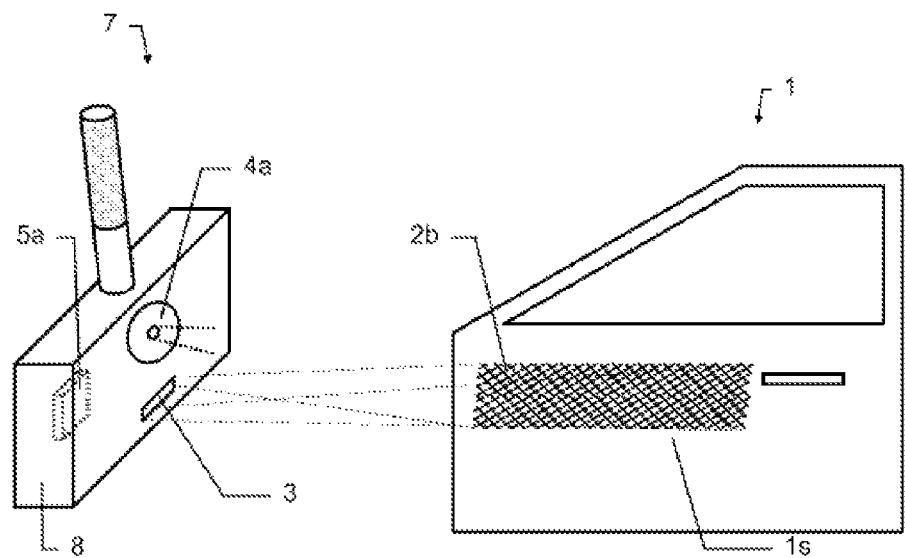

FIGS. 3 and 4 illustrate an optical measurement system 7 according to the invention with a handheld measurement head 8 having an IMU (with inertial sensors 5a), projector 3 and a camera 4a (for example integrated in a handheld housing with handle and thus configured as a light structure 3D hand scanner), wherein a car door as the measurement object 1 is illuminated successively with patterns 2a, 2b having different degrees of fineness as part of the pattern sequence (FIG. 3: coarser pattern 2a; and FIG. 4: finely structured pattern 2b).

As is known from the prior art, thus the object (for example car door) is illuminated with a sequence of light patterns 2a, 2b with different structure fineness in order to obtain an unambiguous depth determination of the measurement points in the measurement region with the aid of triangulation (intersection). Here a plurality of images are also recorded (i.e. a series of images) with illumination of the measurement object 1 with the corresponding different patterns 2a, 2b (i.e. with the series of patterns).

According to the invention, once again an inertial measurement unit (with inertial sensors 5a) is integrated into the measurement head 8 of the 3D scanner illustrated in FIGS. 3 and 4, as a result of which a compensation according to the invention of for example measurement errors caused by unsteadiness related to hand tremors can be effected in the course of the evaluation of the image sequence and the derivation of the 3D coordinates. In particular controlled by the evaluation unit automatically and in a preprogrammed fashion, the illustrated optical measurement system 7 can be configured and designed for carrying out individual or a plurality of the above described embodiments of the optical measurement method according to the invention.

Figure 5:
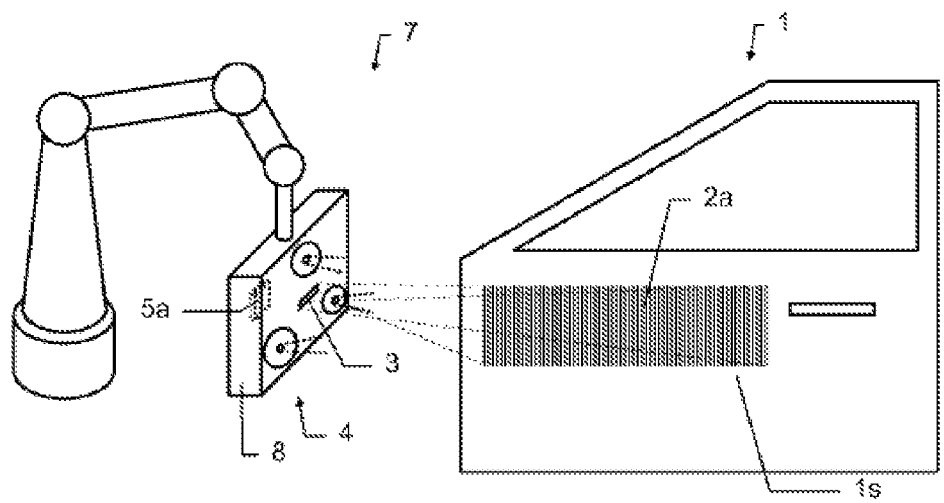
FIGS. 5 and 6 show an optical measurement system according to the invention with a measurement head held by a robot arm, wherein a car door as the measurement object is illuminated successively with stripe patterns having different degrees of fineness.
Figure 6:
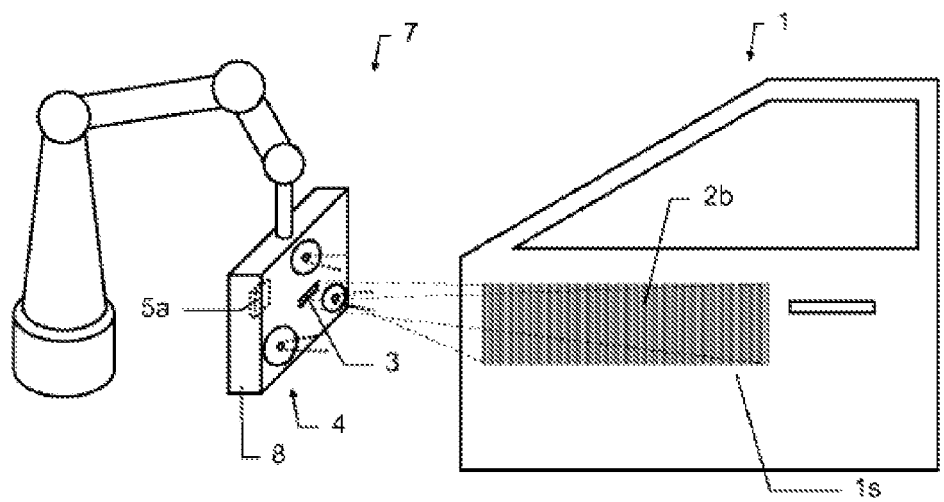

FIGS. 5 and 6 illustrate an optical measurement system 7 according to the invention similar to that from FIGS. 3 and 4, except here the measurement head 8 is configured as a measurement head 8 held by a robot arm and the projector is configured for the successive projection of stripe patterns 2a, 2b having different finenesses as a pattern sequence.

According to the invention, the measurement head 8 illustrated in FIGS. 3 and 4 also has an inertial measurement unit IMU (with inertial sensors 5a), as a result of which a compensation according to the invention of measurement errors, which are caused for example by vibrations transferred to the robot arm from the measurement region environment, can be effected in the course of the evaluation of the image sequence and of the derivation of the 3D coordinates. Alternatively or additionally, the measured accelerations can also be used for the spatial joining together ("stitching") of individual images captured from different robot arm positions (as part of one or more image sequences), such that—depending on the choice of the different recording positions, which can be adapted by the person skilled in the art according to the requirements—the measurement region can thus be enlarged and/or densified, or a change of speckle fields which occur inadvertently in the case of illuminating with substantially coherent optical radiation in the respective patterns 2a, 2b of the pattern sequence and thus a reduction of local measurement inaccuracies or measurement point gaps caused by such speckle fields can be effected.

Figure 7:
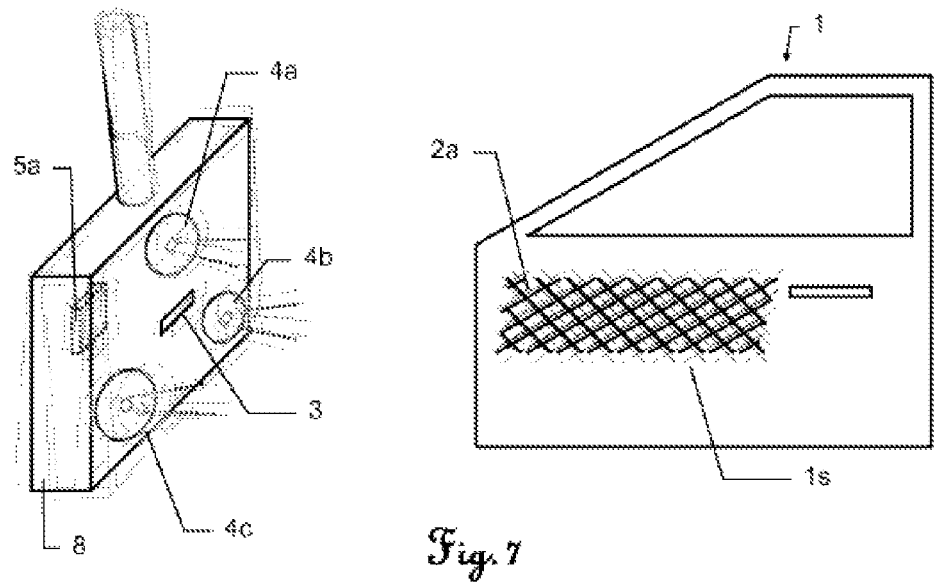
FIG. 7 shows an optical measurement system according to the invention with a handheld measurement head, wherein unsteadiness caused by a hand tremor during the measurement is illustrated.
Figure 9:
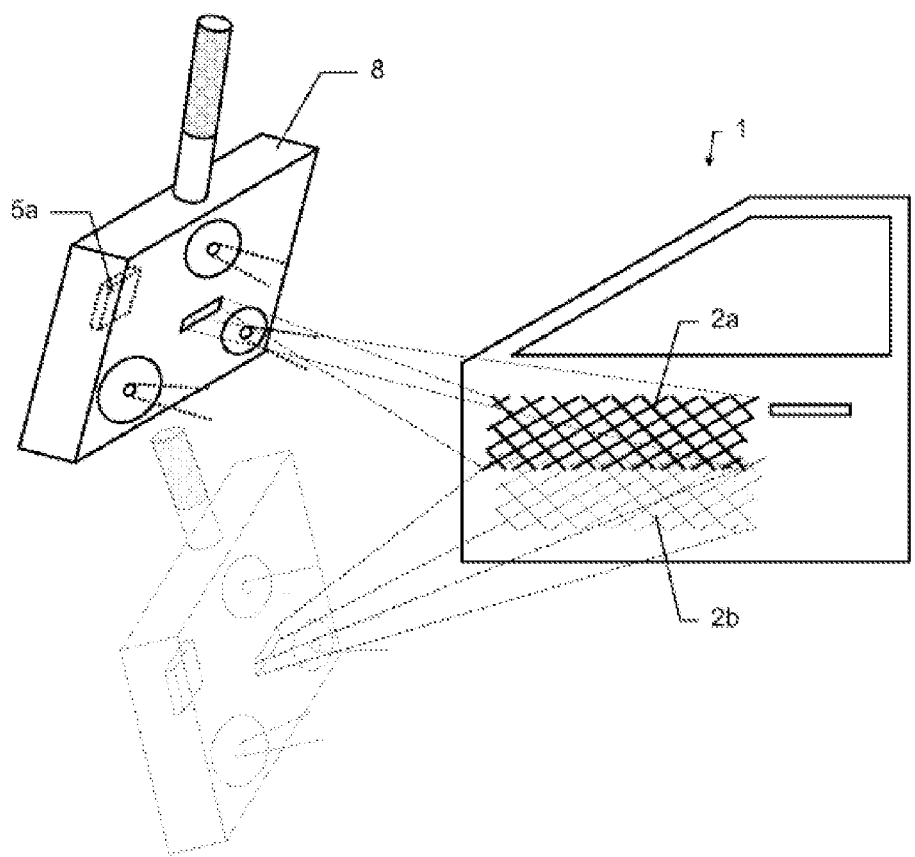
FIG. 9 shows an optical measurement system according to the invention with a handheld measurement head having an IMU, wherein the measurement head is brought into different positions to enlarge the measurement region and the images recorded in the different positions are linked together on the basis of the measured accelerations.

FIGS. 7 and 9 show a similar measurement system 7 as in FIG. 1 and illustrate here an unsteadiness/movement of the measurement head 8 (inadvertently caused by hand tremor or—for example for purposes of densification or enlargement of the measurement region—deliberately) during a measurement. The accelerations measured using the IMU (with inertial sensors 5a) can then be used for spatially joining together ("stitching") the individual images captured from different handheld positions (as part of one or more image sequences).

In addition, it is possible here for a camera shake of individual pattern projections 2*a*, 2*b* (of a pattern sequence) to be effected on the measurement object 1 and a camera shake of individual image recordings (of an image sequence) to be effected, wherein the errors caused by the camera shake in the image can likewise be corrected or compensated or taken into consideration according to the invention in the course of the 3D coordinates determination using the accelerations measured by the IMU integrated in the measurement head 8.

Figure 8:
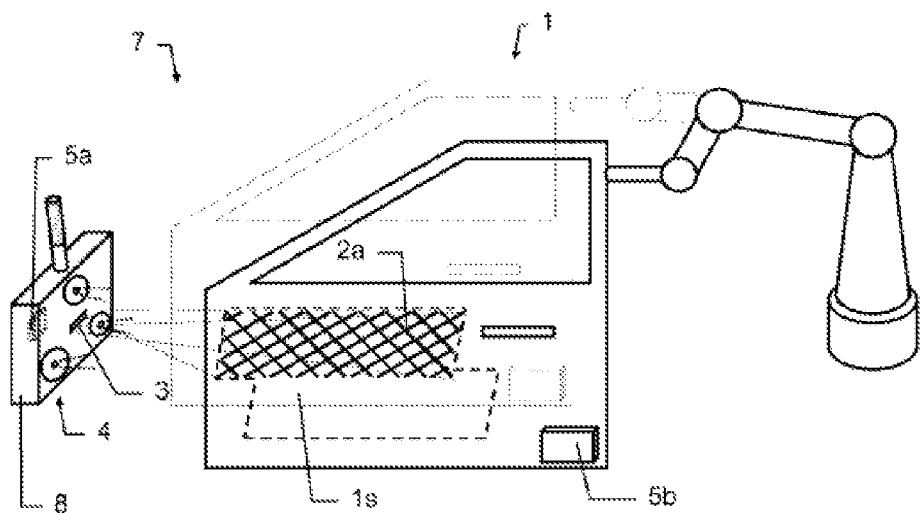
FIG. 8 shows an optical measurement system according to the invention with an IMU arranged on the measurement object, wherein the measurement object is brought into different positions to enlarge the measurement region and the images recorded in the different positions are linked together on the basis of the measured accelerations.

FIG. 8 illustrates an optical measurement system 7 according to the invention having an IMU (with inertial sensors 5*b*) arranged on the measurement object 1, wherein the measurement object 1 can be brought into different positions for enlarging the measurement region and—according to the invention—the different positions of the measurement object 1 recorded in the individual images (of the image sequence) can be linked on the basis of the accelerations measured by the IMU and be brought into a spatial relationship with respect to one another.

In addition to the IMU (with inertial sensors 5*b*) on the measurement object 1, it is also again possible for an IMU (with inertial sensors 5*a*) to be integrated into the measurement head 8 as well. As a result it is possible—as described above—in addition for movements of the measurement head 8 occurring during the measurement to also be taken into consideration according to the invention during the determination of depth information and of the 3D coordinates.

FIG. 10 shows an optical measurement system 7 according to the invention in use in a production line, wherein the vibrations affecting measurements with the measurement system 7 according to the invention, which vibrations are transferred from a neighboring production station, are compensated for on the basis of the measured accelerations.

To this end, in each case one IMU (with inertial sensors 5*a* and/or 5*b*) can be arranged according to the invention—as also described for example above in connection with FIG. 8—both on the measurement object 1 and integrated into the measurement head 8 (which in this case has two cameras purely by way of example), as a result of which a compensation according to the invention of measurement errors, which are caused for example by vibrations transferred to the robot arm from the measurement region environment and by unsteadiness of the measurement head 8, can be effected in the course of the evaluation of the image sequence and of the derivation of the 3D coordinates.

It can be appreciated that these illustrated figures illustrate schematically only possible exemplary embodiments. The different approaches can likewise be combined with one another and with methods of the prior art.

What is claimed is:

1. An optical measurement method for determining 3D coordinates of a multiplicity of measurement points of a measurement object surface, comprising the steps of:
    illuminating the measurement object surface with a pattern sequence of different patterns using a projector;
    recording an image sequence of a plurality of individual images of the measurement object surface, which is illuminated with the pattern sequence, using a camera system; and
    determining the 3D coordinates of the measurement points by evaluating the image sequence including ascertaining a succession of brightness values for identical measurement points of the measurement object surface in the respective images of the image sequence, wherein:
    during the recording of the image sequence at least during the exposure times of individual images of the image sequence, translational and/or rotational accelerations:
        of the projector,
        of the camera system, and/or
        of the measurement object,
    are measured for each image with at least such a measurement rate that during the exposure time of each image of the image sequence for each image a plurality of values for the accelerations related to one particular direction of acceleration are captured so that movements of the projector, of the camera system and/or of the measurement object, which provoke camera shake and/or motion blur in the respective individual images of the image sequence and occur during the exposure times of the respective individual images of the image sequence, are algorithmically taken into consideration in the determination of the 3D coordinates on the basis of the measured accelerations.

2. The optical measurement method as claimed in claim 1, wherein a multiplicity of values for the accelerations are captured.

3. The optical measurement method as claimed in claim 1, wherein accelerations of the projector, of the camera system and/or of the measurement object are measured in all six degrees of freedom and the accelerations are measured continuously at a specific measurement rate.

4. The optical measurement method as claimed in claim 1, wherein accelerations of the projector, of the camera system and/or of the measurement object are measured in all six degrees of freedom and the accelerations are measured continuously at a specific measurement rate between approximately 50 and 2000 Hz during the entire operation of recording the image sequence.

5. The optical measurement method as claimed in claim 1, wherein:
    in dependence on the measured accelerations, compensation and/or correcting of camera shake and/or motion blur, which are caused by movements of the projector, of the camera system and/or of the measurement object occurring during the exposure times of the respective individual images of the image sequence, take place respectively in the individual images of the image.

6. The optical measurement method as claimed in claim 1, wherein:
    in dependence on the measured accelerations, compensation and/or correcting of camera shake and/or motion blur, which are caused by movements of the projector, of the camera system and/or of the measurement object occurring during the exposure times of the respective individual images of the image sequence, take place respectively in the individual images of the image sequence; and
    the movements are caused:
        by a user holding in his hand the projector, the camera system and/or the measurement object, in particular caused by a hand tremor and inadvertently, or
    by vibrations or oscillations in the holders of the projector, of the camera system and/or of the measurement object.

7. The optical measurement method as claimed in claim 1, wherein during the entire operation of recording the image sequence or a plurality of image sequences, the accelerations are measured and the information obtained by the evaluation of the individual images with respect to the 3D coordinates of the measurement points are joined together in a computational manner using the measured accelerations, wherein during the operation of recording:

for enlarging the measurement region on the measurement object surface, for densifying the measurement region and thus for increasing the measurement point density on the measurement object surface and/or for changing speckle fields, which occur inadvertently in the case of illumination with substantially coherent optical radiation, in the respective patterns of the pattern sequence and thus for decreasing local measurement inaccuracies or measurement point gaps caused by such speckle fields;

the measurement object, the camera system and/or the projector is moved, the movement which is effected for this purpose is effected by:

a user holding in his hand the measurement object and/or the camera system, and/or a holder which is designed therefor and controlled manually or in an automatically preprogrammed fashion robot arm for the projector, the camera system and/or the measurement object.

8. The optical measurement method as claimed in claim 1, wherein for the computational joining together spatial relationships between the individual recorded images relative to one another with respect to their recording positions and directions relative to the measurement object, which relationships are derived from the measured accelerations, are used as start conditions such that the computational joining together per se requires a reduced computational outlay with respect to a method where such start conditions are not used.

9. The optical measurement method as claimed in claim 1, wherein the 3D coordinates of the measurement points are determined photogrammetically according to a triangulation principle from the image sequence and with the knowledge of the pattern of the pattern sequence captured in the respective images of the image sequence.

10. The optical measurement method as claimed in claim 1, wherein the 3D coordinates of the measurement points are determined photogrammetically according to a triangulation principle from the image sequence and with the knowledge of the pattern of the pattern sequence captured in the respective images of the image sequence using intersection.

11. The optical measurement method as claimed in claim 1, wherein the illumination and the recording of positions which are known relative to one another is effected from alignments which are known relative to one another.

12. The optical measurement method as claimed in claim 1, wherein the illumination and the recording of positions which are known relative to one another is effected from alignments which are known relative to one another and the recording is effected with a plurality of cameras as parts of the camera system from different positions.

13. The optical measurement method as claimed in claim 1, wherein the measurement object surface is illuminated successively with stripe patterns of different degrees of fineness,
pseudocodes, and/or
random patterns
as the different patterns of the pattern sequence.

14. The optical measurement method as claimed in claim 13, wherein the illumination is effected with the individual patterns substantially in direct temporal succession with a projection duration of approximately between 100 and 300 ms.

15. The optical measurement method as claimed in claim 13, wherein the illumination is effected with the individual patterns substantially in direct temporal succession with a projection duration of approximately 200 ms, and the recording of the image sequence takes place with an exposure duration per image of in each case approximately between 100 ms and 300 ms.

16. The optical measurement method as claimed in claim 13, wherein the illumination is effected with the individual patterns substantially in direct temporal succession with a projection duration of approximately 200 ms, and the recording of the image sequence takes place with an exposure duration per image of in each case approximately 200 ms.

17. The optical measurement method as claimed in claim 1, wherein during the entire operation of recording the image sequence or a plurality of image sequences, the accelerations are measured and the information obtained by the evaluation of the individual images with respect to the 3D coordinates of the measurement points are joined together in a computational manner using the measured accelerations.

18. An optical measurement system for determining 3D coordinates of a multiplicity of measurement points of a measurement object surface, comprising:

a projector for illuminating the measurement object surface with a pattern sequence of different optical patterns;

a camera system for recording an image sequence of a plurality of individual images of the measurement object surface that is illuminated with the pattern sequence; and an evaluation unit for determining the 3D coordinates of the measurement points from the image sequence, wherein the evaluation unit determines the 3D coordinates of the measurement points from the image sequence while ascertaining a succession of brightness values for identical measurement points of the measurement object surface in the respective images of the image sequence, wherein inertial sensors are arranged:

on the projector,
on the camera system, and/or
on the measurement object for measuring the translational and rotational accelerations of the projector, of the camera system, and/or of the measurement object with at least such a measurement rate that during the exposure time of each individual image of the image sequence in each case a plurality of values for the accelerations related to one particular direction of acceleration can be captured, and in that the evaluation unit is configured:

for synchronized controlling of the inertial sensors and of the camera system such that during the recording of the image sequence for each image a plurality of values for the accelerations related to one particular direction of acceleration are captured at least during the exposure time of each individual image of the image sequence, and for algorithmically taking into consideration movements of the projector, of the camera system and/or of the measurement object, which provoke camera shake and/or motion blur in the respective individual images of the image sequence, on the basis of the accelerations measured by the inertial sensors for the determination of the 3D coordinates.

19. The optical measurement system as claimed in claim 18, wherein in each case a multiplicity of values for the accelerations can be captured.

20. The optical measurement system as claimed in claim 18, wherein the inertial sensors are combined and integrated into an inertial measurement unit such that the inertial measurement unit is configured for measuring the accelerations in all six degrees of freedom.

21. The optical measurement system as claimed in claim 18, wherein the inertial sensors are combined and integrated into an inertial measurement unit based on MEMS-based components such that the inertial measurement unit is configured for measuring the accelerations in all six degrees of freedom at a measurement rate of approximately 50 to 2000 Hz.

22. The optical measurement system as claimed in claim 18, wherein the evaluation unit is configured such that, in dependence on the measured accelerations, compensation and/or correcting of camera shake and/or motion blur, which are caused by movements of the projector, of the camera system and/or of the measurement object occurring during the exposure times of the respective individual images of the image sequence take place respectively in the individual images of the image sequence.

23. The optical measurement system as claimed in claim 18, wherein the projector and the camera system are accommodated with fixed and known positioning and orientation relative to one another physically in a common measurement head of the measurement system, in which the inertial sensors are also arranged.

24. The optical measurement system as claimed in claim 23, wherein the measurement head is configured to be capable of being held by hand and/or for being attached to a robot arm.

25. The optical measurement system as claimed in claim 18, wherein the camera system has at least one camera.

26. The optical measurement system as claimed in claim 18, wherein the camera system contains two, three or four cameras, which are arranged with a fixed and known positioning and orientation relative to one another and are configured for the substantially simultaneous recording of individual images.

27. An optical measurement system for determining 3D coordinates of a multiplicity of measurement points of a measurement object surface, comprising:
 a projector for illuminating the measurement object surface with a pattern sequence of different optical patterns;
 a camera system for recording an image sequence of a plurality of individual images of the measurement object surface that is illuminated with the pattern sequence; and
 an evaluation unit for determining the 3D coordinates of the measurement points from the image sequence, wherein the evaluation unit determines the 3D coordinates of the measurement points from the image sequence while ascertaining a succession of brightness values for identical measurement points of the measurement object surface in the respective images of the image sequence, wherein inertial sensors are arranged:
 on the projector,
 on the camera system, and/or
 on the measurement object
 for measuring the translational and rotational accelerations of the projector, of the camera system, and/or of the measurement object with at least such a measurement rate that during the exposure time of each individual image of the image sequence in each case a plurality of values for the accelerations related to one particular direction of acceleration can be captured, and in that the evaluation unit is configured:
 for synchronized controlling of the inertial sensors and of the camera system such that during the recording of the image sequence for each image a plurality of values for the accelerations related to one particular direction of acceleration are captured at least during the exposure time of each individual image of the image sequence;
 for algorithmically taking into consideration movements of the projector, of the camera system and/or of the measurement object, which provoke camera shake and/or motion blur in the respective individual images of the image sequence, on the basis of the accelerations measured by the inertial sensors for the determination of the 3D coordinates.

* * * * *